United States Patent [19]

Gent

[11] Patent Number: 4,847,120

[45] Date of Patent: Jul. 11, 1989

[54] COMPOSITIONS AND PROCESSES PRODUCING SCRATCH RESISTANT POLYSILOXANE COATINGS

[75] Inventor: John A. G. Gent, Hampshire, England

[73] Assignee: Cogent Limited, London, England

[21] Appl. No.: 268,684

[22] Filed: Nov. 7, 1988

Related U.S. Application Data

[63] Continuation of Ser. No. 909,477, Sep. 19, 1986, abandoned.

[30] Foreign Application Priority Data

Sep. 19, 1985 [GB] United Kingdom ................ 8523166

[51] Int. Cl.$^4$ ............................................. B05D 3/02
[52] U.S. Cl. .................................... 427/387; 524/837; 524/838; 106/287.11; 106/287.13; 106/287.14; 106/287.16; 528/30; 528/32; 528/38; 428/412; 428/451; 428/447; 428/480
[58] Field of Search ............................. 524/837, 838; 106/287.11, 287.13, 287.14, 287.16; 528/32, 30, 38; 427/387; 428/412, 451, 447, 480

[56] References Cited

U.S. PATENT DOCUMENTS

| | | | |
|---|---|---|---|
| 3,961,977 | 6/1976 | Koda et al. | 106/287 |
| 4,006,271 | 2/1977 | French et al. | 427/164 |
| 4,394,177 | 7/1983 | Fujioka et al. | 106/287.14 |
| 4,547,397 | 10/1985 | Burzynski et al. | 106/287.16 |
| 4,673,354 | 6/1987 | Culler | 106/287.16 |

*Primary Examiner*—Melvyn I. Marquis
*Attorney, Agent, or Firm*—Larson and Taylor

[57] ABSTRACT

A prepolymer composition for forming a scratch-resistant coating, comprising an acidic, aqueous solution of a polysiloxane prepolymer having non-coreactive side groups and co-reactive side groups other than hydrolysable groups, the composition being curable by evaporation of solvent and a decrease in acidity causing the co-reactive groups to react together to cross-link the polymer. Suitable co-reactive side groups are amino, epoxy and thiol. Suitable non-coreactive side groups are alkyl and gamma methacryloxy propyl. Acidity is suitably achieved by using a volatilisable organic acid such as acetic acid, so that it evaporates with the solvents to decrease the acidity.

40 Claims, No Drawings

COMPOSITIONS AND PROCESSES PRODUCING SCRATCH RESISTANT POLYSILOXANE COATINGS

This application is a continuation of application Ser. No. 06/909,477, filed Sept. 19, 1986, now abandoned.

This invention relates to scratch resistant coatings and in particular with a process for producing scratch-resistant polysiloxane coatings with improved extensibility.

A variety of products, including plastics mouldings, sheets and lenses are conventionally provided with coatings to improve their resistance to scratching and abrasion. Such coatings may be formed from polymers, such as polyurethanes, melamine-formaldehyde resins and polysiloxanes. While polysiloxanes provide the highest scratch-resistance, they suffer from the disadvantage that known "scratch resistant" polysiloxane coatings show the lowest extensibility. This means that on flexure of the base material, the conventional polysiloxane coating tends to craze. The resulting defect in the surface coating can cause initiation of a crack in the base material. Consequently, the impact strengths of known polysiloxane coated substrates tend to be lower than those of the base material. Furthermore, the impact strength of the coated substrate decreases with increase in polysiloxane coating thickness.

There is accordingly a demand for scratch-resistant coatings with improved extensibility which are able to provide a high level of scratch-resistance without adversely affecting the other physical properties of the base substrate.

According to one aspect of the present invention there is provided a prepolymer composition for forming a scratch-resistant coating, comprising an acidic, aqueous solution of a polysiloxane prepolymer having siloxane linkage-forming groups and having non-co-reactive side groups and co-reactive side groups other than a siloxane linkage-forming group, the composition being curable by evaporation of solvent and an increase in pH causing the siloxane linkage-forming groups and also the co-reactive groups to react together to cross-link the polymer. Siloxane linkage-forming groups (i.e. hydroxy, alkoxy or carboxy groups) are present in the polysiloxane prepolymer. These groups react with one another to form siloxane linkages and are differentiated from the "coreactive" groups mentioned above in that the latter are not siloxane linkage-forming groups.

The siloxane linkage-forming groups of the prepolymer preferably have alkoxy groups or acid-stabilised hydrolysable derivatives thereof, whereby the curing process involves further formation of siloxane linkages through the interaction of these groups.

A second aspect of the invention provides a method of forming a scratch-resistant coating, which comprises coating a substrate with the prepolymer composition and curing it through evaporation of solvent and an increase in pH.

The increase in pH may be produced by the addition of an alkaline component, but is most suitably brought about by using the combination of a basic co-reactive side group such as amino on a silane together with a volatilisable acid in the prepolymer composition, whereby the acid evaporates with the solvent during curing. Suitable acids are organic acids, for example lower alkanoic acids such as formic, acetic and propionic acids.

Evaporation of solvent can take place at room temperature, but suitably heat is applied, especially to assist in the removal of volatilisable acid.

According to a third aspect of the present invention there is provided a process for producing a polysiloxane prepolymer composition for forming a scratch-resistant coating, which comprises:

(i) forming an aqueous acidic solution of two or more silanes or their oligomers, said silanes or oligomers having hydrolysable groups, one of the silanes or oligomers having at least one non-coreactive side group, and one only of the silanes or oligomers having a co-reactive group other than alkoxy or hydrolysable derivative thereof, and allowing the solution to form siloxane linkages by the interaction of the hydrolysable groups; and (ii) adding at least one further silane or its oligomer which has at least one hydrolysable group and a group which is capable of co-reacting with said co-reactive group in (i) under conditions of lower dilution and increased pH, and allowing the solution to form siloxane linkages between the existing polysiloxane and the added silane or oligomer.

The procedure preferably also includes the further step of adding further acid to stabilise the prepolymer solution.

In a preferred embodiment, a process for forming a polysiloxane prepolymer in accordance with the invention comprises:

(a) reacting, in aqueous acid solution, at least one first silane or oligomer thereof and at least one second silane or oligomer thereof to cause the formation of a siloxane reaction product, each of said first and second silanes or oligomers thereof having siloxane linkage-forming groups, the first silane or oligomer thereof having a non-coreactive side group attached to a silicon atom thereof and only said second silane or oligomer thereof having a first coreactive side group other than a siloxane linkage-forming group, said first coreactive side group being attached to a silicon atom thereof, said siloxane reaction product having siloxane linkage-forming groups and having siloxane linkage formed through said siloxane linkage-forming groups of said first and second silanes or oligomers thereof, having a non-coreactive side group attached to a silicon atom thereof, and having a first coreactive side group attached to a different silicon atom thereof; and (b) reacting, in aqueous acidic solution, said siloxane reaction product and a third silane or oligomer thereof to form said polysiloxane prepolymer in aqueous acidic solution, said third silane or oligomer thereof having siloxane linkage-forming groups and having a second coreactive side group other than a siloxane linkage-forming group, said second coreactive side group being capable of cross-linking reaction with said first coreactive side group, said reaction with said third silane or oligomer thereof to form said polysiloxane prepolymer being effected such that there is no substantial interaction between said first and second coreactive groups, said polysiloxane prepolymer having siloxane linkage-forming groups, having said non-coreactive side group attached to a silicon atom thereof, having said first coreactive side group attached to a different silicon atom thereof, and having said second coreactive group attached to a still different silicon atom thereof, said prepolymer being curable by removal of solvent and an increase in pH of said aqueous acidic solution to an extent sufficient to form further siloxane linkages and to cause said first and second coreactive groups to coreact.

In addition to water and acid, the solution may also include one or more alcohols or other water-miscible solvents. Alcohols are preferred for a variety of reasons. They assist in wetting the substrate during application of the coating. The lower alcohols are also relatively easily volatilised, and can form azeotropes to assist in solvent removal. Suitable alcohols include methyl, ethyl and isopropyl alcohols, but there is no definite limit on the number of carbon atoms, the alcohol being rather selected according to its physical properties in relation to the other components and the intended mode of use. During the course of polysiloxane formation through the reaction of alkoxy groups, alcohols will be formed through the hydrolysis of the alkoxy groups, thereby increasing the alcohol content of the solution. The alkoxy groups can accordingly be selected to produce suitable alcohols in the solution. In general, alkoxy groups of 1 to 6, preferably 1 to 4 carbon atoms will be suitable.

The non-coreactive side group or groups can be those conventionally employed in modifying polysiloxane formation; typically lower alkyls such as methyl, ethyl, isopropyl and t-butyl. Other bulky side groups may be used such as aryl and its derivatives or other non-coreactive side groups which may be specifically added to improve adhesion to substrate such as gamma methacryloxy propyl in the case of acrylics. Bulky and/or long non-coreactive side groups limit the extent of cross-linking by providing sites which cannot be cross-linked, and also hold the molecules apart during cross-linking so as to resist contraction as the cross-linking proceeds.

The co-reactive groups should be less reactive than the siloxane linkage-forming groups (i.e. hydrolysable groups) under the conditions of prepolymerisation, so that there is no substantial interaction between the co-reactive groups at that stage. This is achieved by appropriate selection of co-reactive groups, and also by selection of the conditions of prepolymerisation, in particular by maintaining a relatively high dilution, and also by appropriate choice of pH.

Suitable co-reactive groups are epoxy and amino groups. The amino groups may be primary or secondary amino. These have the advantage that amino groups catalyse the formation of the silicon-oxygen lattice, so that this, and also the interaction of the amino and epoxy groups, can be influenced by controlling the pH: in particular, a decrease in acidity will encourage the formation of cross-linkages.

Examples of other co-reactive groups are thiols which react with epoxy, vinyl, acrylic or methacrylic groups.

At least one, and preferably each, of the co-reactive side groups forms part of a larger group in which the reactive group is separated from the silicon atom by a connecting group which has at least one single bond allowing rotation of the reactive group. Examples of connecting groups are $-(CH_2)_n-$ and $-(CH_2)_n-O-$, the latter being particularly preferred for epoxy, n preferably being an integer of 1 to 3.

A wide variety of silanes or their oligomers having different functional groups are commercially available from e.g. Union Carbide and Dow-Corning. In order to provide sufficient stability in the coating solution (and a viscosity which is not excessively high), the mixture of silanes should preferably contain non-co-reactive groups in a molar amount which is at least equal to 40% of the co-reactive groups and other non-siloxane linkage-forming groups (e.g. epoxide, amino and alkyl groups).

Typically, the mixture of silanes or their oligomers may comprise an epoxyalkylalkoxy silane and an aminoalkylalkoxy silane in which at least two alkoxy groups are present in each silane. Generally, the mixture of silanes will include in addition at least one alkylalkoxy silane in order to increase the proportion of non-coreactive groups in the composition.

Typical amino containing silanes are amino (lower alkyl) triethoxy or trimethoxy silanes. Suitable epoxy silanes include glycido lower alkyl triethoxy or trimethoxy silanes. Dimers or oligomers of these alkoxy silanes may be used. The alkyl-alkoxy silane is preferably a lower alkyl triethoxy or trimethoxy silane.

As an optional ingredient of the silane mixture, one may use silanes containing other functional groups, e.g. groups which improve adhesion to the substrate, and groups which modify viscosity. For example, the presence of silanes containing methacrylic groups can be used to improve adhesion of the modified polysiloxane coatings to polymethyl methacrylate substrates.

As indicated above the mixture of silanes preferably contains non-coreactive groups in a mole percent of at least 20, normally at least 30, based on the total amount of co-reactive groups and non-coreactive groups, i.e. other non-siloxane linkage-forming groups attached to the silicon atom. It is not essential for the epoxide and amino groups (or other co-reactive groups) to be present in stoichiometric proportions. However, we prefer to formulate the composition so that it contains an excess of amino groups since these groups both catalyse the formation of the SiO lattice (by virtue of their basic character) as well as reacting with the epoxide groups.

The scratch-resistant coating is suitably produced by the application of a prepolymer composition. The first stage in the formation of this composition is to prepare a solution of one or more silanes or their oligomers which can react through their siloxane linkage-forming groups to form siloxane linkages, without substantial interaction of the co-reactive groups. One way of achieving this is to omit one of the co-reactive group-containing silanes or their oligomers initially, so that polymerisation can only proceed through the formation of siloxane linkages. This is initiated by the presence of water in the solution. The solution may contain alcohol such as isopropyl alcohol as co-solvent, and the solution will need to be acidic to control the rates of hydrolysis and polymerisation. A weak organic volatilisable acid such as a lower alkanoic acid is preferred. Additional strong mineral acids are not desirable, particularly where amino is one of the reactive groups because of the formation of insoluble salts and the difficulty of their removal from the composition. The procedure is described further in U.S. Pat. No. 4,006,271.

The initial solution at controlled pH may be allowed to age for a period, e.g. 24 hours, to form siloxane linkages, whereupon the third silane having the other co-reactive group is added, again controlling pH, either in solution or alone. The solution is allowed to age for a further period, e.g. 30 mins, for the added silanes or their oligomers to react with the existing siloxanes through their siloxane linkage-forming groups; and then the acidity is adjusted to pH 3 to 6. This stepwise addition of the third silanes or their oligomers having co-reactive groups prevents premature reaction between the co-reactive groups.

The prepolymer can then be used immediately for coating, or it can be stored until required. In the latter case, it may be desirable to add further solvent or acid, or both, to stabilise the solution and give it appropriate shelf-life.

The prepolymer coating solution may be applied by any known coating method to a clean substrate, such as any of the method described in U.S. Pat. No. 4,006,271. Normally, the substrate will be a polymeric, easily scratched surface, but the coating composition can be applied to any substrate including wood. The composition can be used to coat mouldings, shaped articles and sheet or film. Examples of polymer materials which are advantageously coated with the composition include polyesters, polycarbonates, and polymethyl methacrylates.

After application the coating is preferably heated to remove the solvent and acid and bring about cure of the coating by formation of siloxane linkages and cross-linking through the co-reactive groups. However, the coating compositions will dry and cure at ambient temperatures when coated in a thin film on a substrate. The removal of solvent and acid increases the pH so as to make the groups more reactive and increases the concentration (decreases the dilution of molecules) so that the co-reactive groups are brought into closer proximity.

The compositions of the invention may also include other conventional ingredients for modifying the properties. Examples of these are dyestuffs, levelling agents and fillers, together with other known adhesion promoting additives such as zirconium and titanium derivatives.

The following example will illustrate the invention and the manner in which it may be carried into effect.

EXAMPLE 1

A solution of cross-linkable organo polysiloxane was prepared by adding with stirring a mixture of 88.85 g methyl trimethoxysilane (Dow Corning Z6070) and 37.05 g of gamma glycidoxypropyl trimethoxysilane (Dow Corning Z6040), to a solution comprising 21.88 g of distilled water, 27.71 g of propan-2-ol, and 0.85 g of glacial acetic acid. The resultant solution was allowed to stand for 24 hours, forming an initial polysiloxane having methyl (non-reactive) groups, epoxy (one of the co-reactive) groups, and some unpolymerised methoxy groups.

To this solution was then added an additional 64.09 g of water, 39.36 g of propan-2-ol, 51.56 g of butan-1-ol and 8.80 g of glacial acetic acid, to increase the dilution; and then 34.67 g, of gamma-amino-propyl triethoxysilane (Union Carbide A1100) was added and allowed to stand 30 minutes.

This extended the polymer largely by reaction of ethoxy groups of the added silane with methoxy groups of the existing polysiloxane; the lower reactivity of the amino and epoxy groups, especially under the conditions of dilution and acidity, largely preventing these groups from interacting at this stage.

An additional 14.37 g of glacial acetic acid was then added and the resultant solution aged at 20° C. for 5 days before use. This allows acetoxy groups to be formed and produces a stable equilibrium solution of prepolymer under the conditions of high acidity and dilution.

The polycarbonate moulding to be coated was cleaned using acetone and air dried. The coating was applied using a wire-wound wet film applicator rod and the coated moulding was placed in an air circulating oven for 2 hours at 97° C. This causes the solvent comprising acetic acid, water and alcohols, to evaporate, resulting in an increase in pH which increases the reactivity of the co-reactive amino and epoxy groups, and a decrease in dilution which brings these groups closer together so that they can co-react to cross-link the polysiloxane.

After a further period of 24 hours, the coated area was examined for scratch resistance by rotating 50 times with an 000 steel wool pad under a load of 500 g per $cm^2$, no scratching occurred in the coated area, whereas the uncoated area suffered severe scratching.

EXAMPLE 2

A solution prepared as in Example 1 was coated onto a $75 \times 10^{-6}$ meters thick polyethylene terephthalate film using a wire wound applicator rod and was then dried for 2 hours at 97° C. to give a dry film coating weight of 10 grams per square meter.

The resultant coated film when wrapped around a 5 mm mandrel did not crack or craze. A 70 mm long 25 mm wide strip of coated film when subjected to an elongation of 10% using a tensometer with crosshead speed of 3 mm/min did not cause further fracture of the coating.

EXAMPLE 3

A solution of a cross-linkable organo polysiloxane was prepared by adding, with stirring, a mixture of 7.04 g of gamma methacryloxy propyl trimethoxy silane (Union Carbide A-174) with 1.62 g of gamma glycidoxy propyl trimethoxy silane (Dow Corning Z6040) to a solution comprising of 2.19 g distilled water, 2.77 g of propan-2-ol and 0.09 g of glacial acetic acid. To this mixture was added, with stirring, a mixture of 2.09 g of gamma glycidoxypropyl trimethoxysilane (Dow Corning Z6040) with 5.01 g of methyl trimethoxysilane (Dow Corning Z6070). This was allowed to stand for 5 minutes.

To this solution, with stirring, was added 6.41 g of distilled water, 3.94 g of propan-2-ol, 5.16 g of butan-1-ol, and 0.88 g of glacial acetic acid and then 3.47 g of gamma amino propyl triethyoxy silane (Union Carbide A1100). After 30 minutes 1.44 g of glacial acetic acid was added.

This solution was stored at 20° C. for 10 days.

The solution prepared as described was then used to coat a $75 \times 10^{-6}$ meter thickness polyethylene terephthalate film using a wire wound applicator rod which was then dried for 2 hours at 97° C. to give a dry film coating weight of 6 grams per square meter.

The resultant film when wrapped around a 5 mm diameter mandrel did not crack or craze.

A 70 mm long 25 mm wide strip of the coated film when subjected to an elongation of 10%, using a tensometer with a crosshead of 3 mm/min, did not cause fracture of the coating.

EXAMPLE 4

A solution of a cross-linkable organo polysiloxane was prepared by adding, with stirring, a mixture 8.89 g of methyl trimethoxy silane (Dow Corning Z6070) with 3.71 g of gamma glycidoxypropyl trimethoxy silane (Dow Corning Z6040) to a solution comprising 2.19 g of distilled water, 2.77 g of propan-2-ol and 0.09 g of glacial acetic acid. This was allowed to stand at 20° C. for 24 hours.

To this solution, with stirring, was added 6.41 g of distilled water, 3.94 g of propan-2-ol, 5.16 g of butan-1-ol and 0.88 g of glacial acetic acid and then 2.50 g of gamma mercapto propyl trimethoxy silane (Union Carbide A189). After 30 mins 1.44 g of glacial acetic acid was added to the solution. The resultant solution was stored at 20° C. for 5 days before use.

The solution prepared as described above was used to coat a $75 \times 10^{-6}$ meter thick polyethylene terephthalate film using a wire wound applicator rod. The film was dried for 10 mins at 97° C. to give a dry coating weight of 4 grams per square meter.

The resultant coated film when wrapped around a 5 mm diameter rod did not crack or craze. Also when subjected to a 10% elongation as described in Example 3 the coating did not fracture.

EXAMPLE 5

A solution of a cross-linkable organo polysiloxane was prepared by adding, with stirring, a mixture of 8.89 g of methyl trimethoxy silane (Dow Corning Z6070) with 3.71 g of gamma glycidoxy propyl trimethoxy silane (Dow Corning Z6040) to a solution comprising 2.19 g distilled water, 2.77 g of propan-2-ol and 0.09 g of glacial acetic acid. This was allowed to stand for 24 hours at 20° C.

To this solution, with stirring, was added 6.41 g of distilled water, 3.94 g of propan-2-ol, 5.16 g butan-1-ol and 0.88 g of glacial acetic acid and then 3.07 g of gamma mercapto propyl trimethoxy silane. After 30 minutes 1.44 g of glacial acetic acid was added. The resultant solution was stored 5 days at 20° C. before use.

The solution as prepared above was used to coat 8 mm thick polymethyl methacrylate using a wire wound applicator. The coating was dried/cured for 2 hours at 97° C. to give a dry coating weight of 4 grams per square meter. The resultant coated sheet could be thermoformed around a 20 cm diameter mandrel without fracture of the coating.

The resulting coating was examined for scratch resistance using an 000 steel wool pad and was found to give excellent scratch resistance.

EXAMPLE 6

A solution of a cross-linkable organo polysiloxane was prepared by adding, with stirring, a mixture of 8.89 g of methyl trimethoxysilane (Dow Corning Z6070) with 3.71 g of gamma glycidoxypropyl trimethoxysilane (Dow Corning Z6040) to a solution comprising 2.19 g distilled water, 2.77 g of propan-2-ol and 0.09 g of glacial acetic acid. This was allowed to stand at 20° C. for 24 hours.

To this solution, with stirring, was added 6.41 g of distilled water, 3.94 g of propan-2-ol, 5.16 g of butan-1-ol and 0.88 g of glacial acetic acid and then 3.47 g of gamma amino propyl triethoxysilane (Union Carbide A1100). After 30 mins 1.44 g of glacial acetic acid was added. This solution was stored at 20° C. for 5 days.

After 5 days the solution was diluted with a solvent mixture comprising of 3.44 g distilled water, 2.68 g propan-2-ol, 2.06 g butan-1-ol and 0.39 g glacial acetic acid. To this solution was added 0.16 g of amino zircoaluminate chloride hydroxide polymer (Cavedon Chemical Co - CAVCO MOD APG-2) and dispersed using a high shear mixer for 30 seconds.

The solution prepared as described above was used to coat a $75 \times 10^{-6}$ meter thick polyethylene terephthalate film, using a wire wound applicator rod. The film was dried for 2 hrs at 97° C. to give a dry coating weight of 10.4 grams per square meter.

The resultant film when wrapped around a 5 mm diameter mandrel did not crack or craze.

I claim:

1. A process for producing in aqueous acidic solution a polysiloxane prepolymer comprising:
    (a) reacting, in aqueous acid solution, at least one first silane or oligomer thereof and at least one second silane or oligomer thereof to cause the formation of a siloxane reaction product, each of said first and second silanes or oligomers thereof having siloxane linkage-forming groups, the first silane or oligomer thereof having a non-coreactive side group attached to a silicon atom thereof and only said second silane or oligomer thereof having a first coreactive side group other than a siloxane linkage-forming group, said first coreactive side group being attached to a silicon atom thereof, said siloxane reaction product having siloxane linkage-forming groups and having siloxane linkage formed through said siloxane linkage-forming groups of said first and second silanes or oligomers thereof, having said non-coreactive side group attached to a silicon atom thereof, and having said first coreactive side group attached to a different silicon atom thereof; and
    (b) reacting, in aqueous acidic solution, said siloxane reaction product and a third silane or oligomer thereof to form said polysiloxane prepolymer in aqueous acidic solution, said third silane or oligomer thereof having siloxane linkage-forming groups and having a second coreactive side group other than a siloxane linkage-forming group, said second coreactive side group being capable of cross-linking reaction with said first coreactive side group, said reaction with said third silane or oligomer thereof to form said polysiloxane prepolymer being effected such that there is no substantial interaction between said first and second coreactive groups, said polysiloxane prepolymer having siloxane linkage-forming groups, having said non-coreactive side group attached to a silicon atom thereof, having said first coreactive side group attached to a different silicon atom thereof, and having said second coreactive group attached to a still different silicon atom thereof, said prepolymer being curable on removal of solvent and an increase in pH of said aqueous solution to an extent sufficient to form further siloxane linkages and to cause said first and second coreactive groups to coreact.

2. A process according to claim 1 further comprising adding acid to said aqueous acidic solution containing said polysiloxane prepolymer to stabilize said polysiloxane prepolymer.

3. A process according to claim 1 wherein said aqueous acidic solution contains a volatilisable alcohol.

4. A process according to claim 1 wherein said aqueous acidic solution contains a lower alkanoic acid.

5. A process according to claim 1 wherein said aqueous acidic solution contains a volatilisable organic acid.

6. A process according to claim 1 wherein said non-coreactive side group is selected from alkyl or aryl.

7. A process according to claim 1 wherein said non-coreactive side group comprises gamma methacryloxypropyl.

8. A process according to claim 1 wherein one of said first and second coreactive groups comprises an epoxy group and wherein the other of said first and second coreactive groups comprises an amino group.

9. A process according to claim 1 wherein one of said first and second coreactive groups comprises a thiol group and the other of said first and second coreactive groups comprises an epoxy, vinyl, acrylic, or methacrylic group.

10. A process according to claim 1 wherein at least one of said first and second coreactive groups is connected to a silicon atom through a single bond allowing rotation of the coreactive group.

11. A process according to claim 10 wherein said bond is in a connecting group which is —(CH$_2$)$_n$— or —(CH$_2$)$_n$—O—, wherein n is 1 to 3.

12. A process according to claim 1 wherein said non-coreactive groups are present in an amount of at least 20 mole % based on the total amount of said first and second coreactive groups and said non-coreactive groups.

13. A process according to claim 1 wherein the non-coreactive groups are present in an amount of at least 40 mole % based on the total amount of said non-coreactive groups and said first and second coreactive groups.

14. A process according to claim 1 wherein one of said first and second coreactive groups is amino, and wherein said amino group is present in stoichiometric excess relative to the other of said first and second coreactive groups.

15. A prepolymer composition for forming a scratch-resistant coating, said composition comprising an acidic solution of a polysiloxane prepolymer in solvent, said polysiloxane prepolymer having siloxane linkages, having siloxane linkage-forming groups, and having a non-coreactive side group attached to a silicon atom of said prepolymer, a first coreactive side group other than a siloxane linkage-forming group attached to a different silicon atom of said prepolymer, and a second coreactive side group other than a siloxane linkage-forming group, said second coreactive side group being attached to a still different silicon atom of said prepolymer and being capable of cross-linking reaction with said first coreactive side group, said composition being curable by removal of solvent and a decrease in acidity of said acidic solution to an extent sufficient to form further siloxane linkages and to cause said first and second coreactive groups to coreact.

16. A prepolymer composition according to claim 15 wherein said non-coreactive side group selected from alkyl or aryl.

17. A prepolymer composition according to claim 15 wherein said non-coreactive side group comprises gamma methacryloxypropyl.

18. A prepolymer composition according to claim 15 wherein one of said first and second coreactive groups comprises an epoxy group and wherein the other of said first and second coreactive groups comprises an amino group.

19. A prepolymer composition according to claim 15 wherein one of said first and second coreactive groups comprises a thiol group and the other of said first and second coreactive groups comprises an epoxy, vinyl, acrylic, or methacrylic group.

20. A prepolymer composition according to claim 15 wherein at least one of said first and second coreactive groups is connected to a silicon atom through a single bond allowing rotation of the coreactive group.

21. A prepolymer composition according to claim 20 wherein said bond is in a connecting group which is —(CH$_2$)$_n$— or —(CH$_2$)$_n$—O—, wherein n is 1 to 3.

22. A prepolymer composition according to claim 15 wherein said non-coreactive groups are present in an amount of at least 20 mole % based on the total amount of said first and second coreactive groups and said non-coreactive groups.

23. A prepolymer composition according to claim 15 wherein the non-coreactive groups are present in an amount of at least 40 mole % based on the total amount of said non-coreactive groups and said first and second coreactive groups.

24. A prepolymer composition according to claim 15 wherein said solvent comprises water and a volatilisable alcohol.

25. A prepolymer composition according to claim 24 wherein said acidic solution contains a lower alkanoic acid.

26. A prepolymer composition according to claim 24 wherein said acidic solution contains a volatilisable organic acid.

27. A method of forming a scratch-resistant coating which comprises: coating on a substrate an acidic solution comprising a polysiloxane prepolymer in solvent, said polysiloxane prepolymer having siloxane linkages, having siloxane linkage-forming groups and having a non-coreactive side group attached to a silicon atom thereof, having a first coreactive side group other than a siloxane linkage-forming group attached to a different silicon atom thereof, and having a second coreactive side group other than a siloxane linkage-forming group attached to a still different silicon atom thereof, said second coreactive side group being capable of cross-linking reaction with said first coreactive side group; and curing said coating by removing solvent from said coating and by decreasing the acidity of said solution sufficiently to cause said first and second coreactive groups to undergo said cross-linking reaction to cure said coating.

28. A method according to claim 27 wherein said solvent contains a volatilisable acid and wherein removing said solvent comprises evaporating said solvent to cause evaporation of said volatilisable acid.

29. A method according to claim 28 wherein said volatilisable acid comprises a lower alkanoic acid.

30. A method according to claim 27 wherein said solvent comprises water and a volatilisable alcohol.

31. A method according to claim 27 wherein said non-coreactive side group is selected from alkyl or aryl.

32. A method according to claim 27 wherein said non-coreactive side group comprises gamma methacryloxypropyl.

33. A method according to claim 27 wherein one of said first and second coreactive groups comprises an epoxy group and wherein the other of said first and second coreactive groups comprises an amino group.

34. A method according to claim 27 wherein one of said first and second coreactive groups comprises a thiol group and the other of said first and second coreactive groups comprises an epoxy, vinyl, acrylic, or methacrylic group.

35. A method according to claim 27 wherein at least one of said first and second coreactive groups is connected to a silicon atom through a single bond allowing rotation of the coreactive group.

36. A method according to claim 35 wherein said bond is in a connecting group which is $-(CH_2)_n-$ or $-(CH_2)_n-O-$, wherein n is 1 to 3.

37. A method according to claim 27 wherein said non-coreactive groups are present in an amount of at least 20 mole % based on the total amount of said first and second coreactive groups and said non-coreactive groups.

38. A method according to claim 27 wherein the non-coreactive groups are present in an amount of at least 40 mole % based on the total amount of said non-coreactive groups and said first and second coreactive groups.

39. A method according to claim 27 wherein one of the said first and second coreactive groups is amino, and wherein said amino group is present in stoichiometric excess relative to the other of said first and second coreactive groups.

40. A method according to claim 27 wherein said non-coreactive group and said first and second coreactive groups are each attached to different silicon atoms of said polysiloxane prepolymer.

* * * * *